(12) United States Patent
Tani et al.

(10) Patent No.: US 11,168,184 B2
(45) Date of Patent: Nov. 9, 2021

(54) PRODUCTION PROCESS OF RUBBER COMPOSITION

(71) Applicant: JSR Corporation, Minato-ku (JP)

(72) Inventors: Koichiro Tani, Minato-ku (JP); Ryota Funaki, Minato-ku (JP); Rikimaru Kuwabara, Minato-ku (JP); Hiroyuki Morita, Minato-ku (JP); Takaomi Matsumoto, Minato-ku (JP)

(73) Assignee: JSR Corporation, Minato-ku (JP)

( * ) Notice: Subject to any disclaimer, the term of this patent is extended or adjusted under 35 U.S.C. 154(b) by 0 days.

(21) Appl. No.: 16/783,210

(22) Filed: Feb. 6, 2020

(65) Prior Publication Data

US 2020/0172682 A1  Jun. 4, 2020

Related U.S. Application Data

(63) Continuation of application No. PCT/JP2018/030198, filed on Aug. 13, 2018.

(30) Foreign Application Priority Data

Aug. 18, 2017 (JP) .............................. JP2017-157862
Jul. 19, 2018 (JP) .............................. JP2018-135473

(51) Int. Cl.
| | |
|---|---|
| *C08J 3/20* | (2006.01) |
| *C08F 236/14* | (2006.01) |
| *C08K 3/06* | (2006.01) |
| *C08K 3/36* | (2006.01) |
| *C08K 5/17* | (2006.01) |
| *C08F 8/30* | (2006.01) |
| *C08F 236/10* | (2006.01) |
| *C08K 5/18* | (2006.01) |
| *C08K 5/3435* | (2006.01) |
| *C08K 5/357* | (2006.01) |
| *C08L 9/06* | (2006.01) |

(52) U.S. Cl.
CPC ............ *C08J 3/203* (2013.01); *C08F 236/10* (2013.01); *C08K 3/36* (2013.01); *C08K 5/17* (2013.01); *C08K 5/18* (2013.01); *C08K 5/3435* (2013.01); *C08K 5/357* (2013.01); *C08L 9/06* (2013.01); *C08J 2309/06* (2013.01); *C08J 2409/06* (2013.01)

(58) Field of Classification Search
CPC .... C08F 236/04; C08F 236/06; C08F 236/08; C08F 236/10; C08F 236/12; C08F 236/14; C08F 8/30; C08K 5/17; C08J 3/203

See application file for complete search history.

(56) References Cited

U.S. PATENT DOCUMENTS

| | | | |
|---|---|---|---|
| 9,085,653 B2 * | 7/2015 | Yamada | ................. C08F 236/10 |
| 2010/0048775 A1 * | 2/2010 | Mihara | ................. C08K 5/548 |
| | | | 524/92 |
| 2014/0155524 A1 | 6/2014 | Shimizu et al. | |
| 2014/0171580 A1 | 6/2014 | Katou et al. | |
| 2016/0115296 A1 | 4/2016 | Yukimura | |

FOREIGN PATENT DOCUMENTS

| | | |
|---|---|---|
| JP | 2000-344954 A | 12/2000 |
| JP | 2001-131344 A | 5/2001 |
| JP | 2001-158835 A | 6/2001 |
| JP | 2010-185053 A | 8/2010 |
| JP | 2012-62383 A | 3/2012 |
| JP | 2012-62437 A | 3/2012 |
| JP | 2012-87167 A | 5/2012 |
| JP | 5845247 B2 | 1/2016 |
| JP | 5890679 B2 | 3/2016 |
| WO | WO 2014/192810 A1 | 12/2014 |

OTHER PUBLICATIONS

Computer-generated English-language translation of WO 2012/008471 A1.*
International Search Report dated Nov. 13, 2018 in PCT/JP2018/030198 filed Aug. 13, 2018, 2 pages.
Extended European Search Report dated Aug. 7, 2020 in European Patent Application No. 18846174.3, 6 pages.
Japanese Office Action dated Feb. 2, 2021 in Japanese Patent Application No. 2019-536773 (with English translation), 6 pages.
Office Action dated Sep. 27, 2021, in corresponding Korean Patent Application No. 10-2020-700277 (with English machine translation).

* cited by examiner

*Primary Examiner* — Vu A Nguyen
(74) *Attorney, Agent, or Firm* — Oblon, McClelland, Maier & Neustadt, L.L.P.

(57) ABSTRACT

A production process of a rubber composition containing a modified conjugated diene-based polymer, which can provide a rubber composition in which processability is excellent, and a filling agent, when contained, has favorable dispersibility therein. The production process of the rubber composition includes: a first step of kneading a modified conjugated diene-based polymer that is obtained by polymerizing a monomer containing a conjugated diene compound and has at least one nitrogen-containing functional group selected from a primary amino group, a secondary amino group, a tertiary amino group and groups in which these amino groups have been converted into an onium group, and a basic compound having an acid dissociation constant of 8.0 or more; and a second step of kneading the kneaded product obtained in the first step and a cross-linking agent.

9 Claims, No Drawings

PRODUCTION PROCESS OF RUBBER COMPOSITION

TECHNICAL FIELD

The present invention relates to a production process of a rubber composition, and more specifically relates to a production process of a rubber composition containing a modified conjugated diene-based polymer.

BACKGROUND ART

A known rubber composition used in automobile tires contains a rubber component comprising a conjugated diene-based polymer, and also contains, as necessary, a filling agent (filler) such as carbon black.

Furthermore, since there is an increasing demand to reduce fuel consumption of automobiles in recent years, silica is used as a filling agent (filler) for the purpose of reducing the rolling resistance of tires to respond to such a demand. In this rubber composition containing silica, a silane coupling agent is compounded for the purpose of suppressing the aggregation of silica in the composition.

Various proposals have been made regarding the rubber composition containing silica and a silane coupling agent for the purpose of enhancing the activity of the coupling function of the silane coupling agent (for example, see Patent Literature 1 to Patent Literature 3).

Also, to respond to the recent demand to reduce fuel consumption of automobiles, various conjugated diene-based polymers capable of achieving excellent reduced fuel consumption performance, specifically modified conjugated diene-based polymers, have been proposed for the rubber composition.

However, a production process for obtaining the rubber composition containing such a modified conjugated diene-based polymer, specifically a kneading condition or the like, has not been sufficiently studied.

CITATION LIST

Patent Literature

Patent Literature 1: International Publication No. 2014/192810
Patent Literature 2: Japanese Patent No. 5845247
Patent Literature 3: Japanese Patent No. 5890679

SUMMARY OF INVENTION

Technical Problem

The present invention has been made in view of the foregoing circumstances, and has as its object the provision of a production process of a rubber composition containing a modified conjugated diene-based polymer, which can provide a rubber composition in which processability is excellent, and a filling agent (filler), when contained, has favorable dispersibility therein.

Solution to Problem

The production process of a rubber composition according to the present invention includes: a first step of kneading a modified conjugated diene-based polymer that is obtained by polymerizing a monomer containing a conjugated diene compound and has at least one nitrogen-containing functional group selected from the group consisting of a primary amino group, a secondary amino group, a tertiary amino group, a primary amino group having been converted into an onium group, a secondary amino group having been converted into an onium group and a tertiary amino group having been converted into an onium group, and a basic compound having an acid dissociation constant of not lower than 8.0; and
a second step of kneading the kneaded product obtained in the first step and a cross-linking agent.

In the production process of a rubber composition according to the present invention, the basic compound having an acid dissociation constant of not lower than 8.0 may preferably be an amine compound.

According to the production process of a rubber composition of the present invention, in the second step, an acidic compound may preferably be kneaded together with the kneaded product and the cross-linking agent.

In such a production process of a rubber composition according to the present invention, the acidic compound may preferably be a saturated fatty acid having 12 to 24 carbon atoms.

In the production process of a rubber composition according to the present invention, the basic compound having an acid dissociation constant of not lower than 8.0 may be generated by kneading a plurality of compounds together with the modified conjugated diene-based polymer in the first step.

In such a production process of a rubber composition according to the present invention, the plurality of compounds may preferably include a sulfenamide-based compound and a thiazole-based compound.

In the production process of a rubber composition according to the present invention, in the first step, silica may preferably be kneaded together with the modified conjugated diene-based copolymer and the basic compound having an acid dissociation constant of not lower than 8.0.

In such a production process of a rubber composition according to the present invention, in the first step, the modified conjugated diene-based polymer, the basic compound having an acid dissociation constant of not lower than 8.0 and silica may preferably be kneaded, and then a silane coupling agent may preferably be added thereto and further kneaded.

In the production process of a rubber composition according to the present invention, the cross-linking agent may preferably be sulfur.

Advantageous Effects of Invention

According to the production process of a rubber composition according to the present invention, a modified conjugated diene-based polymer and a basic compound having an acid dissociation constant of not lower than 8.0 are kneaded, and the obtained kneaded product and a cross-linking agent are kneaded. Therefore, there can be obtained a rubber composition containing a modified conjugated diene-based polymer, in which processability is excellent, and further a filling agent (filler), when contained, has favorable dispersibility therein.

DESCRIPTION OF EMBODIMENTS

Hereinafter, embodiments of the present invention will be described.

The production process of a rubber composition according to the present invention includes: a first step of kneading a modified conjugated diene-based polymer and a basic compound having an acid dissociation constant of not lower than 8.0 (hereinafter, also referred to as merely a "basic compound"); and a second step of kneading the kneaded product obtained in the first step and a cross-linking agent. In this production process of a rubber composition according to the present invention, the modified conjugated diene-based polymer is obtained by polymerizing a monomer containing a conjugated diene compound, and has at least one nitrogen-containing functional group selected from the group consisting of a primary amino group, a secondary amino group, a tertiary amino group, a primary amino group having been converted into an onium group, a secondary amino group having been converted into an onium group and a tertiary amino group having been converted into an onium group.

In the production process of a rubber composition according to the present invention, there can be obtained a rubber composition (unvulcanized rubber composition) including a modified conjugated diene-based polymer, a basic compound, and a cross-linking agent. This rubber composition (unvulcanized rubber composition) is subjected to a cross-linking treatment such as vulcanization to form a rubber elastic body (cross-linked rubber elastic body).

In the rubber composition obtained by the production process of a rubber composition according to the present invention, the modified conjugated diene-based polymer constitutes a rubber component. This rubber component may contain a polymer (hereinafter, also referred to as "other polymer") other than the modified conjugated diene-based polymer, together with the modified conjugated diene-based polymer as an essential component.

Also, the rubber composition according to the present invention may preferably include at least one of silica and carbon black as a filling agent (filler) in addition to the rubber component, the basic compound and the cross-linking agent, from the viewpoint of the properties of a rubber elastic body formed from the rubber composition, and may also preferably include an acidic compound from the viewpoint of cross-linking promotion performance in a cross-linking treatment, processability, handling ease, and the like. Furthermore, when the rubber composition according to the present invention includes silica, it may preferably contain a silane coupling agent from the viewpoint of prevention of silica aggregation in the composition.

Also, the rubber composition according to the present invention may include various additives (hereinafter, also referred to as "other additives") in addition to the rubber component, the basic compound and the cross-linking agent as well as silica, carbon black, the acidic compound and the silane coupling agent.

Examples of the other additives to be used may include a vulcanization aid, a processing aid, a vulcanization promoter, an extender oil (process oil), an anti-aging agent, a scorch retarder, and zinc oxide.

Modified Conjugated Diene-Based Polymer:

As the modified conjugated diene-based polymer, for example, may be used a polymer obtained by polymerizing a monomer containing a conjugated diene compound and, as necessary, an aromatic vinyl compound in the presence of an alkali metal compound or an alkaline earth metal compound as a polymerization initiator to obtain a conjugated diene-based polymer, and reacting the conjugated diene-based polymer with a modifier.

The modified conjugated diene-based polymer has at least one nitrogen-containing functional group selected from the group consisting of a primary amino group, a secondary amino group, a tertiary amino group, a primary amino group having been converted into an onium group, a secondary amino group having been converted into an onium group and a tertiary amino group having been converted into an onium group, but the position of the nitrogen-containing functional group is not particularly limited and may be any of a position in its molecule, a position at a molecular terminal, and a position in a molecular side chain. The modified conjugated diene-based polymer may have a plurality of nitrogen-containing functional groups of the same type.

In the modified conjugated diene-based polymer, the content of vinyl bonds (1,2 bond and 3,4 bond) in the structural unit derived from the conjugated diene compound (hereinafter also referred to as "vinyl group content") may preferably be 0 to 70% from the viewpoint of a low hysteresis loss property in the rubber elastic body formed from the obtained rubber composition. In the present invention, the "vinyl group content" is a value determined by $^1$H-NMR.

As examples of the conjugated diene compounds (conjugated diene-based monomers) used to obtain the modified conjugated diene-based polymer, may be mentioned 1,3-butadiene, isoprene, 2,3-dimethyl-1,3-butadiene, 1,3-pentadiene, 1,3-hexadiene, 1,3-heptadiene, 2,3-dimethylbutadiene, 2-phenyl-1,3-butadiene, 3-methyl-1,3-pentadiene and 2-chloro-1,3-butadiene. These compounds may be used either singly or in any combination thereof. Among these, 1,3-butadiene, isoprene and 2,3-dimethyl-1,3-butadiene may preferably be used. When an aromatic vinyl compound is used as a monomer, 1,3-butadiene may preferably be used from the viewpoint of combination with the aromatic vinyl compound.

The use ratio of the conjugated diene compound may preferably be 45 to 100% by mass per 100% by mass of the total monomer. That is, in the modified conjugated diene-based polymer, the ratio of the structural units derived from the conjugated diene compound may preferably be 45 to 100% by mass per 100% by mass of the modified conjugated diene-based polymer.

As examples of the aromatic vinyl compounds (aromatic vinyl-based monomers) used to obtain the modified conjugated diene-based polymer, may be mentioned styrene, 2-methylstyrene, 3-methylstyrene, 4-methylstyrene, α-methylstyrene, 2,4-dimethylstylene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethylether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene and diphenylethylene containing a tertiary amino group. These compounds may be used either singly or in any combination thereof. Among these, styrene may preferably be used.

The use ratio of the aromatic vinyl compound may preferably be 0 to 55% by mass per 100% by mass of the total monomer from the viewpoint of a low hysteresis loss property in the rubber elastic body formed from the obtained rubber composition. That is, in the modified conjugated diene-based polymer, the ratio of the structural units derived from the aromatic vinyl compound (hereinafter, also referred to as a "bound styrene content") is 0 to 55% by mass per 100% by mass of the modified conjugated diene-based polymer.

As the monomer for obtaining the modified conjugated diene-based polymer, a compound other than the conjugated diene compound and the aromatic vinyl compound (hereinafter also referred to as "other monomer") may be used.

As the other monomers, an appropriate monomer may be used depending on the use application of the obtained rubber composition (specifically, the use application of the rubber elastic body formed from the rubber composition).

As examples of the alkali metal in the alkali metal compound used as the polymerization initiator for obtaining the modified conjugated diene-based polymer, may be mentioned lithium, sodium and potassium. As examples of the alkaline earth metal in the alkaline earth metal compound used as the polymerization initiator, may be mentioned calcium and magnesium. Among these, lithium may preferably be used.

As examples of the alkali lithium used as the polymerization initiator for obtaining the modified conjugated diene-based polymer, may be mentioned alkyl lithium having 1 to 4 carbon atoms. Specific examples thereof may include methyllithium, ethyllithium, n-propyllithium, iso-propyllithium, n-butyllithium, sec-butyllithium and tert-butyllithium.

It may also be preferable to use a chain secondary amine such as diethylamine or a cyclic secondary amine such as piperidine or hexamethyleneimine simultaneously with the use of the polymerization initiator.

As the polymerization method, any of a solution polymerization method, a gas phase polymerization method and a bulk polymerization method may be used, and a solution polymerization method may preferably be adopted. As the polymerization scheme, any of a batch system and a continuous system may be used.

As examples of the specific polymerization method when a solution polymerization method is adopted, may be mentioned a method of anionically polymerizing a monomer containing a conjugated diene compound and, as necessary, an aromatic vinyl compound in a solvent composed of an organic solvent (for example, an aliphatic, alicyclic or aromatic hydrocarbon compound) which is inert to the reaction in the presence of a polymerization initiator and, as necessary, a randomizer (vinyl group-content adjusting agent).

The hydrocarbon compound used as the solvent may preferably be a compound having 3 to 8 carbon atoms.

As examples of the compound having 3 to 8 carbon atoms, may be mentioned propane, n-butane, isobutane, n-pentane, isopentane, n-hexane, cyclohexane, propene, 1-butene, isobutene, trans-2-butene, cis-2-butene, 1-pentine, 2-pentine, 1-hexene, 2-hexene, benzene, toluene, xylene, ethylbenzene, heptane, cyclopentane, methylcyclopentane, methylcyclohexane, 1-pentene, 2-pentene and cyclohexene. These compounds may be used either singly or in any combination thereof.

The randomizer (vinyl group-content adjusting agent) used as necessary is used for adjusting the content of the vinyl group and the like.

As examples of the randomizer, may be mentioned dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine and N-methylmorpholine. These compounds may be used either singly or in any combination thereof.

The temperature of the polymerization reaction may be preferably −20 to 150° C., more preferably 0 to 120° C., particularly preferably 20 to 100° C.

The polymerization reaction may preferably be performed under a pressure sufficient to keep the monomers in a substantially liquid phase. Such a pressure may be achieved with a method such as pressurization of the inside of a reaction vessel with a gas inert to the polymerization reaction.

As examples of the modifier used, may be mentioned a hydrocarbyloxysilane compound having at least one amino group selected from the group consisting of a primary amino group protected by two protecting groups, a secondary amino group protected by one protecting group and a tertiary amino group, and a cyclic silazane compound.

As preferred specific examples of the modifier, may be mentioned
2,2-dimethoxy-1-(3-trimethoxysilylpropyl)-1-aza-2-cyclopentane,
2,2-dimethoxy-8-(4-methylpiperazinyl)methyl-1,6-dioxa-2-silacyclooctane and
N,N-bis(trimethylsilyl)aminopropylmethyldiethoxysilane.

The modification reaction for obtaining the modified conjugated diene-based polymer by reacting the conjugated diene-based polymer with the modifier may be performed, for example, as a solution reaction. The solution reaction may be performed using a solution containing unreacted monomers after completion of the polymerization reaction.

The modification reaction may be performed by a batch system using a batch reaction vessel or may be performed by a continuous system using an apparatus such as a multi-stage continuous reaction vessel. In addition, the modification reaction may preferably be performed after the polymerization reaction is completed and before a desolvation treatment, a water treatment, a heat treatment, various operations necessary for isolation of a polymer, and the like.

The temperature of the modification reaction is the same as the polymerization temperature, and may be preferably −20 to 150° C., more preferably 0 to 120° C., particularly preferably 20 to 100° C.

The reaction time of the modification reaction is preferably 1 minute to 5 hours, more preferably 2 minutes to 1 hour.

The reaction product obtained by the modification reaction may be used as the modified conjugated diene-based polymer, and an onium structure may be introduced thereinto by adding an onium generating agent to the reaction product and mixing them. That is, the modified conjugated diene-based polymer having a primary amino group having been converted into an onium group, a secondary amino group having been converted into an onium group or a tertiary amino group having been converted into an onium group can be obtained.

As the onium generating agent used, may be mentioned metal halides such as silicon tetrachloride, tin tetrachloride, trimethylsilyl chloride, dimethyldichlorosilane, diethylaluminum chloride, zinc chloride, titanium tetrachloride, zirconium tetrachloride, germanium tetrachloride and gallium trichloride, esters of inorganic acids such as diethyl sulfate, trimethyl phosphate and dimethyl carbonate, and organic acids such as benzenesulfonic acid and organic acid derivatives.

The mixing of the reaction product obtained by the modification reaction and the onium generating agent can be performed, for example, in the form of a solution. Mixing may be performed by a batch system using a batch mixer, or may be performed by a continuous system using a device such as a multistage continuous mixer or an in-line mixer.

The amount of the onium generating agent is preferably not less than 0.5 molar equivalent, more preferably not less than 1.0 molar equivalents, relative to the active site (modified portion) of the reaction product.

The method of adding the onium generating agent is not particularly restricted, and a method of adding the agent at once, a method of adding divided portions thereof or a method of continuously adding the agent may be mentioned. Among these, a method of adding the agent at once may preferably be used.

The temperature at which the reaction product obtained by the modification reaction and the onium generating agent are mixed is the same as the above-mentioned polymerization temperature, and may be preferably −20 to 150° C., more preferably 0 to 120° C., particularly preferably 20 to 100° C.

After the reaction product obtained by the modification reaction has been mixed with the onium generating agent, the modified conjugated diene-based polymer may be recovered by a known desolvation method (for example, steam stripping or the like) and a drying operation.

The use ratio of the modified conjugated diene-based polymer may be preferably not less than 20% by mass, more preferably not less than 30% by mass, particularly preferably not less than 40% by mass, in 100% by mass of the rubber component (specifically, 100% by mass of the total of the modified conjugated diene-based polymer and the other polymers).

When the use ratio of the modified conjugated diene-based polymer is too small, there may be a possibility that sufficient dispersibility of filling agents (filler) may not be obtained in the rubber elastic body formed from the obtained rubber composition.

Basic Compound:

The basic compound is a compound having an acid dissociation constant (pKa) of not less than 8.0.

The basic compound having the acid dissociation constant of not less than 8.0 can shorten the time required for rubber kneading (kneading time). It is considered that this is because the presence of the basic compound promotes dissociation of the association state between the functional groups of the modified conjugated diene-based polymer.

As the basic compound, an amine compound is suitably used. The amine compound constituting the basic compound is not particularly limited, but specific examples thereof may include pyrrole (pKa=23.0), indole (pKa=21.0), carbazole (pKa=19.9), pyrazole (pKa=19.8), imidazole (pKa=14.4), piperidine (pKa=11.2), quinuclidine (pKa=11.0), cyclohexylamine (pKa=10.6), piperazine (pKa=9.8), 1,2,3-triazole (pKa=9.3), purine (pKa=8.9), triethylenediamine (pKa=8.8), morpholine (pKa=8.4), and derivatives of these.

As the suitable basic compound, an aliphatic amine compound having a long chain alkyl group or a long chain alkenyl group may also preferably be used.

As examples of the aliphatic amine compound having a long chain alkyl group or a long chain alkenyl group, may be mentioned compounds having a chemical structure represented by $R^1$—$NH_2$, $R^1$—$N(CH_3)_2$ or $R^1$—$NH(CH_2)_xNH_2$ ($R^1$ represents an alkyl group having 10 to 24 carbon atoms or an alkenyl group having 10 to 24 carbon atoms, and x is an alkylene group having 1 to 5 carbon atoms) and their acetates. Specific examples thereof may include 1-aminoundecane, stearylamine, dimethylstearylamine, laurylamine, dimethyllaurylamine, oleylamine, dimethyloctylamine, tallow propylenediamine, and their acetates such as stearylamine acetate.

These aliphatic amine compounds having a long chain alkyl group or a long chain alkenyl group may be used either singly or in any combination thereof. Among these, stearylamine (pKa=10.6) may preferably be used from the viewpoints of availability of the raw material and handleability.

The basic compound may be produced by kneading a plurality of compounds, specifically, a plurality of compounds for generating the basic compound (hereinafter, also referred to as "compounds for generation") together with the modified conjugated diene-based polymer in the first step. Here, in the first step, all of the basic compounds to be subjected to the first step may be produced from a plurality of compounds for generation, and a part thereof may be produced from a plurality of compounds for generation.

A combination of a sulfenamide-based compound and a thiazole-based compound may suitably be used as the plurality of compounds for generation.

When a sulfenamide-based compound and a thiazole-based compound are used as a plurality of compounds for generation, for example, a sulfenamide-based compound and a thiazole-based compound are added to a rubber material containing the modified conjugated diene-based polymer, and kneaded under predetermined conditions to produce a disulfide compound and an amine compound. The produced amine compound is kneaded as a basic compound with the conjugated diene-based polymer.

As the sulfenamide-based compound constituting the compound for generation, may be mentioned N-cyclohexyl-2-benzothiazole sulfenamide (CBS), N-(tert-butyl)-2-benzothiazole sulfenamide (TBBS) and N-morpholino-2-benzothiazole sulfenamide (MBS). These compounds may be used either singly or in any combination thereof.

As the thiazole-based compound constituting the compound for generation, may be mentioned 2-mercaptobenzothiazole (MBT).

The combination of the sulfenamide-based compound and the thiazole-based compound may preferably be a combination of N-cyclohexyl-2-benzothiazole sulfenamide (CBS) and 2-mercaptobenzothiazolyl (MBT), which produce cyclohexylamine (pKa=10.6), because of its availability and stability of the basic compound produced.

The use ratio of the basic compound may preferably be 0.5 to 10 parts by mass per 100 parts by mass of the rubber component.

When the use ratio of the basic compound is excessive, there may be a possibility that sufficient mechanical strength and abrasion resistance cannot be obtained in the rubber elastic body formed from the obtained rubber composition.

Silica:

Examples of the silica may include wet silica (hydrous silicic acid), dry silica (anhydrous silicic acid), calcium silicate and aluminum silicate. Among these, wet silica may preferably be used.

The use ratio of the silica is 10 to 200 parts by mass, preferably 20 to 130 parts by mass, and more preferably 25 to 110 parts by mass, per 100 parts by mass of the rubber component.

Silane Coupling Agent:

Examples of the silane coupling agent may include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane and 2-mercaptoethyltriethoxysilane; and 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzoyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide and 3-octanoylthio-1-propyltriethoxysilane. These compounds may be used either singly or in any combination thereof. Among these, bis(3-triethoxysilylpropyl) trisulfide, bis(3-triethoxysilylpropyl) disulfide and 3-trimethoxysilylpropylbenzothiazolyl tetrasulfide may preferably be used from the viewpoint of the effect of improving the reinforcing property.

The use ratio of the silane coupling agent may preferably be 0.5 to 20 parts by mass per 100 parts by mass of silica.

When the use ratio of the silane coupling agent is less than 0.5 parts by mass, the sufficient reinforcing property and fracture resistance property may not be obtained in the rubber elastic body formed from the obtained rubber composition, and sufficient abrasion resistance may not be obtained. In addition, if the use ratio of the silane coupling agent exceeds 20 parts by mass, an effect corresponding to an increase in cost tends not to be obtained.

Carbon Black:

Carbon black is not particularly restricted, and common carbon black to be compounded in the rubber composition may be used. Specific examples thereof may include GPF, FEF, HAF, ISAF and SAF. Among these, ISAF, SAF and HAF may be preferably used, and ISAF may be more preferably used.

The nitrogen adsorption specific surface area ($N_2SA$) of carbon black may be preferably not less than 50 $m^2/g$, more preferably not less than 90 $m^2/g$, further preferably not less than 100 $m^2/g$, particularly preferably not less than 110 $m^2/g$. When the $N_2SA$ of carbon black is less than 50 $m^2/g$, the rubber elastic body formed from the obtained rubber composition may not have the sufficient reinforcing property and fracture resistance property, and may not have sufficient abrasion resistance and on-ice/snow performance.

The $N_2SA$ of carbon black may be preferably not more than 250 $m^2/g$, more preferably not more than 230 $m^2/g$, further preferably not more than 180 $m^2/g$, particularly preferably not more than 130 $m^2/g$. When the $N_2SA$ of the carbon black exceeds 250 $m^2/g$, it becomes difficult to disperse the carbon black in the rubber composition, and the abrasion resistance and the fracture resistance property of the rubber elastic body formed from the rubber composition tend to deteriorate.

It should be noted that the $N_2SA$ of carbon black is measured in accordance with JIS K 6217-2:2001.

The dibutyl phthalate (DBP) oil absorption of carbon black may be preferably not less than 50 ml/100 g and not more than 200 ml/100 g, more preferably not less than 50 ml/100 g and not more than 135 ml/100 g.

When the DBP oil absorption of carbon black is less than 50 ml/100 g, the sufficient reinforcing property and fracture resistance property may not be obtained in the rubber elastic body formed from the obtained rubber composition, and sufficient abrasion resistance may not be obtained. When the DBP oil absorption of carbon black exceeds 200 ml/100 g, the processability of the rubber composition and the abrasion resistance and fracture resistance property of the rubber elastic body formed from the rubber composition may be lowered.

It should be noted that the DBP adsorption of carbon black is measured according to JIS K 6217-4: 2001.

The iodine adsorption (IA) of carbon black may preferably be not less than 60 mg/g. The use of such carbon black improves the grip performance and the fracture resistance property of the rubber elastic body formed from the rubber composition.

The use ratio of carbon black is 0 to 200 parts by mass, preferably 5 to 130 parts by mass, more preferably 10 to 110 parts by mass, per 100 parts by mass of the rubber component.

Cross-Linking Agent:

As examples of the cross-linking agents, may be mentioned vulcanizing agents such as sulfur, sulfur halide, organic peroxides, quinone dioximes, organic polyvalent amine compounds, alkylphenol resins having methylol groups, and the like. Among these, sulfur is usually used.

The use ratio of the cross-linking agent may be preferably 0.1 to 10 parts by mass, more preferably 0.5 to 5 parts by mass, per 100 parts by mass of the rubber component.

When the use ratio of the cross-linking agent is less than 0.1 parts by mass, cross-linking may hardly proceed. When the use ratio of the cross-linking agent exceeds 10 parts by mass, cross-linking tends to proceed during kneading due to the action of some of the cross-linking agents, and the physical properties of the vulcanizate, i.e., the rubber elastic body formed from the rubber composition, may be impaired.

When the above-mentioned vulcanizing agent is used as the cross-linking agent, a vulcanizing promotor may be used in combination.

Acidic Compound:

As the acidic compound, saturated fatty acids having 12 to 24 carbon atoms and their metal salts are suitably used.

As the saturated fatty acids having 12 to 24 carbon atoms and metal salts thereof constituting the acidic compound, may be mentioned lauric acid, tridecylic acid, myristic acid, pentadecylic acid, palmitic acid, margaric acid, stearic acid, nonadecylic acid, arachidic acid, henicosylic acid, behenic acid, tricosylic acid, lignoceric acid, and calcium salts and zinc salts of these saturated fatty acids. These saturated fatty acids and metal salts may be used either singly or in any combination thereof. Among these, stearic acid may preferably be used.

The use ratio of the acidic compound may preferably be 0.3 to 15 parts by mass per 100 parts by mass of the rubber component.

Other Polymers:

As examples of the other polymers constituting the rubber component together with the modified conjugated diene-based polymer, may be mentioned natural rubber, synthetic isoprene rubber, butadiene rubber, modified butadiene rubber, styrene-butadiene rubber, ethylene-α-olefin copolymer rubber, ethylene-α-olefin-diene copolymer rubber, acrylonitrile-butadiene copolymer rubber, chloroprene rubber, butyl halide rubber, styrene-isoprene copolymer rubber, butadiene-isoprene copolymer rubber, random styrene-butadiene-isoprene copolymer rubber, styrene-acrylonitrile-butadiene copolymer rubber, acrylonitrile-butadiene copolymer rubber and polystyrene-polybutadiene-polystyrene block copolymer, and mixtures thereof.

Other Additives:

As the extender oil, may be mentioned an aroma oil, a naphthenic oil, and a paraffin oil.

The use ratio of the extender oil is, for example, 0 to 50 parts by mass per 100 parts by mass of the rubber component.

As examples of the anti-aging agent, may be mentioned N-(1,3-dimethylbutyl)-N'-phenyl-p-phenylenediamine.

As the vulcanization promotor, a known compound may be used. As specific examples thereof, may be mentioned a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound and a xanthate-based compound.

As preferred specific examples of the vulcanization promotor, may be mentioned sulfenamide-based vulcanization promotors such as N-cyclohexyl-2-benzothiazil sulfenamide (CBS) and N-tetra-butyl-2-benzothiazil sulfenamide (TBBS).

The use ratio of the vulcanization promotor may be appropriately determined in consideration of the type and use ratio of the basic compound and/or the compound for generation, and may preferably be 0.5 to 5 parts by mass per 100 parts by mass of the rubber component.

As other additives, in addition to the aforementioned vulcanization aid, processing aid, vulcanization promoter, extender oil (process oil), anti-aging agent, scorch retarder and zinc oxide, known additives such as a softener, a colorant, aflame retardant, a lubricant, a blowing agent, a plasticizer, an antioxidant, a ultraviolet inhibiter, an antistatic agent, an anticolorant, and other blending agents may be used, as necessary, according to the purpose of use of the rubber composition.

First Step:

The first step is a step of kneading at least the modified conjugated diene-based polymer and the basic compound to obtain a kneaded product containing the modified conjugated diene-based polymer and the basic compound. In this first step, a portion or the entirety of the basic compound may be generated by kneading a plurality of compounds for generation together with the modified conjugated diene-based polymer. That is, a portion or the entirety of the basic compound may be generated in the first step.

In the first step, silica and a silane coupling agent may preferably be kneaded, as necessary, together with the modified conjugated diene-based polymer and the basic compound. It is noted that when the basic compound is generated in the first step, silica and the silane coupling agent may be kneaded together with the modified conjugated diene-based polymer and the plurality of compounds for generation.

In the first step, another polymer (a polymer other than the modified conjugated diene-based polymer), an extender oil, an anti-aging agent, and the like are also kneaded together as necessary.

In the first step, an acidic compound, which is considered to be preferably kneaded in the second step, may be kneaded together.

Thus, in the first step, other components can be kneaded together with the modified conjugated diene-based polymer and the basic compound or the compounds for generation. The kneadings of the basic compound and/or the compounds for generation and the modified conjugated diene-based polymer start at the same time. The kneadings of other components may start at the same time as the modified conjugated diene-based polymer. Alternatively, other components may be added and kneaded after the modified conjugated diene-based polymer and the basic compound have been kneaded. When the basic compound and/or the compounds for generation are added and kneaded after the addition of other components in the first step, the effects of the present invention may not be sufficiently obtained.

When silica is subjected to the first step to produce the rubber composition containing silica, silica can have favorable dispersibility from the viewpoint of a balance with low fuel consumption performance in a rubber elastic body formed from the obtained rubber composition.

When the silane coupling agent is subjected to the first step, the modified conjugated diene-based polymer, the basic compound and silica may preferably firstly be kneaded, and then the silane coupling agent may preferably be added thereto and further kneaded.

Specifically, the modified conjugated diene-based polymer, the basic compound and components (specifically, silica and the like) other than the silane coupling agent, out of the component to be subjected to the first step as necessary, may preferably be firstly kneaded, and then the silane coupling agent may preferably be added (post-added) to the kneaded product and further kneaded.

When the silane coupling agent is post-added in the first step, the obtained rubber composition can have enhanced processability, and a rubber elastic body formed from the rubber composition can have an enhanced low hysteresis property. Furthermore, silica can have enhanced dispersibility.

When the silane coupling agent is post-added, the timing of adding the silane coupling agent is appropriately determined depending on the type of silica, the use ratio of silica, kneading conditions, and the like, in consideration of the type and use ratio of the modified conjugated diene-based polymer, the use ratio of the basic compound, and the like.

When the silane coupling agent is post-added, at least the modified conjugated diene-based polymer, the basic compound and/or the compounds for generation and silica may preferably be compounded and kneaded for 0.5 to 10 minutes, and then the silane coupling agent may preferably be added thereto and kneaded for 0.5 to 10 minutes.

As examples of a kneader used in the first step, may be mentioned open or closed kneaders such as a plastomill, a Banbury mixer, a roll, and an internal mixer.

The kneading temperature in the first step is 30 to 180° C., preferably 50 to 160° C. When the kneading temperature in the first step is not lower than 160° C., the obtained rubber composition may have deteriorated processability.

A technique for subjecting the silane coupling agent to the first step is not limited to post-adding and kneading the silane coupling agent, and may include concurrently kneading the silane coupling agent together with all other components to be subjected to the first step to obtain a kneaded product containing the silane coupling agent.

Second Step:

The second step is a step of adding at least a cross-linking agent to the kneaded product obtained in the first step, and kneading the kneaded product and the cross-linking agent to obtain a kneaded product containing the modified conjugated diene-based polymer, the basic compound and the cross-linking agent, that is, the rubber composition.

In this second step, an acidic compound may preferably be kneaded together with the cross-linking agent and the kneaded product obtained in the first step.

In the second step, zinc oxide and a vulcanization promoter (when the basic compound or the compounds for generation have a vulcanization promoting effect, a vulcanization promoter based on a compound other than the basic compound and the compounds for generation) are also kneaded together as necessary. When the plurality of compounds for generation used in the first step has a vulcanization promoting effect, it is preferable that the vulcanization promoter is not used in the second step.

In the second step, a rubber composition is usually obtained by a technique of concurrently kneading all components to be subjected to the second step (specifically, the kneaded product obtained in the first step, the cross-linking agent, and other components to be subjected to the step as necessary, such as the acidic compound, zinc oxide and the vulcanization promoter).

When the acidic compound is subjected to the second step, the obtained rubber composition can have enhanced processability, and a rubber elastic body formed from the rubber composition can have an enhanced low hysteresis property. When the rubber composition includes a filling agent (specifically, silica and carbon black), the filling agent can have enhanced dispersibility.

In the second step, the kneader used in the first step is used.

The kneading temperature in the second step is 30 to 130° C., preferably 50 to 110° C. When the kneading temperature in the second step is not lower than 130° C., the obtained rubber composition may have deteriorated processability.

The rubber composition obtained by the above-described production process of a rubber composition according to the present invention is an unvulcanized rubber composition, and, for example, is subjected to a cross-linking treatment such as vulcanization to forma rubber elastic body (cross-linked rubber elastic body).

The production process of a rubber composition according to the present invention includes: kneading a basic compound together with a specific modified conjugated diene-based polymer having at least one nitrogen-containing functional group selected from the group consisting of a primary amino group, a secondary amino group, a tertiary amino group, a primary amino group having been converted into an onium group, a secondary amino group having been converted into an onium group, and a tertiary amino group having been converted into an onium group; and kneading the obtained kneaded product and a cross-linking agent. Therefore, even when the modified conjugated diene-based polymer is compounded as a rubber component, processability can be improved while the modified conjugated diene-based polymer maintains its excellent low fuel consumption performance. Furthermore, when a filling agent (filler) is contained, the filling agent can have improved dispersibility.

Therefore, according to the production process of a rubber composition of the present invention, there can be obtained a rubber composition containing a modified conjugated diene-based polymer, in which processability is excellent, and a filling agent (filler), when contained, has favorable dispersibility therein.

Such effects of the production process of a rubber composition according to the present invention are significant when the modified conjugated diene-based polymer has a primary amino group having been converted into an onium group, a secondary amino group having been converted into an onium group, or a tertiary amino group having been converted into an onium group.

The present inventors repeatedly conducted experiments, and found that the above-described effects can be obtained by, in the production process of a rubber composition according to the present invention, selectively using a basic compound having an acid dissociation constant of not lower than 8.0 to a specific modified conjugated diene-based polymer, kneading the basic compound and the modified conjugated diene-based polymer, and kneading the kneaded product and a cross-linking agent.

A rubber elastic body formed from the rubber composition obtained by the production process of a rubber composition according to the present invention is suitably used as a tire, specifically as a tire tread.

Such a tire formed from the rubber composition obtained by the production process of a rubber composition according to the present invention can have excellent performance, because the tread has high strength and a desired shape.

The rubber elastic body formed from the rubber composition obtained by the production process of a rubber composition according to the present invention can also be used as a tire member other than a tread, a rubber vibration isolator, a fender, a belt, a hose, and other industrial products.

EXAMPLES

Although specific examples of the present invention will be described below, the present invention is not limited to these examples. It is noted that "%" in Production Examples, Examples and Comparative Examples described below is on a mass basis, unless otherwise stated.

Also, measurement methods of various physical property values in Production Examples, Examples, and Comparative Examples described below are as follows.

Bound Styrene Content (Content Ratio of Structural Unit Derived from Styrene):

The bound styrene content was obtained by $^1$H-NMR at 500 MHz.

Vinyl Group Content:

The vinyl group content was obtained by $^1$H-NMR at 500 MHz.

Mooney Viscosity:

The Mooney viscosity was determined in accordance with JIS K6300-1, using an L rotor, under the conditions of a preheating time of 1 minute, a rotor operation time of 4 minutes, and a temperature of 100° C.

Weight-Average Molecular Weight Before Modification:

Using a gel permeation chromatography (GPC) apparatus ("HLC-8120" manufactured by Tosoh Corporation), the polystyrene-equivalent weight-average molecular weight was calculated from a retention time corresponding to a top of the maximum peak of a GPC curve obtained under the following GPC conditions.

GPC Conditions:
Column: two "GMHXL" (trade name) columns (manufactured by Tosoh Corporation)
Column temperature: 40° C.
Mobile phase: tetrahydrofuran
Flow rate: 1.0 ml/min
Sample concentration: 10 mg/20 ml Production Example 1: Production Example of Modified Conjugated Diene-Based Polymer Into an autoclave reaction vessel having an inner volume of 5 liters substituted with nitrogen, there were charged 2,500 g of cyclohexane as a solvent, 50 g of tetrahydrofuran as a vinyl group content adjusting agent (randomizer) and 125 g of styrene and 365 g of 1,3-butadiene as monomers. After the temperature of the contents in the reaction vessel was adjusted to 10° C., 5.20 mmol of n-butyllithium as a polymerization initiator was added to initiate polymerization. The polymerization was performed under adiabatic conditions, and the maximum temperature reached 85° C.

At 25 minutes after the initiation of polymerization, it was confirmed that the polymerization conversion ratio reached 99%, and 10 g of 1,3-butadiene was added over 1 minute. Thereafter, 1.65 mmol of 2,2-dimethoxy-1-(3-trimethoxysilylpropyl)-1-aza-2-silacyclopentane as a modifier was added, and reacted for 15 minutes. Here, immediately before adding the modifier, a polymer before modification was sampled for measuring the weight-average molecular weight.

To the obtained polymer solution containing the modified conjugated diene-based copolymer, 4.40 g of 2,6-di-tert-butyl-p-cresol was added. Next, desolvation by steam stripping was performed, and drying by a roll warmed to 110° C. was performed to obtain a modified conjugated diene-based copolymer (hereinafter, also referred to as a "modified conjugated diene-based copolymer (A)").

The polymerization formula and physical properties of the obtained modified conjugated diene-based copolymer (A) are shown in Table 1 and Table 2, respectively.

Production Example 2: Production Example of Modified Conjugated Diene-Based Polymer A modified conjugated diene-based copolymer (hereinafter, also referred to as a "modified conjugated diene-based copolymer (B)") was obtained in the same method as that in Production Example 1, except that in Production Example 1, 1.88 mmol of silicon tetrachloride was further added after 4.40 g of 2,6-di-tert-butyl-p-cresol was added to the polymer solution containing the modified conjugated diene-based copolymer.

Specifically, into an autoclave reaction vessel having an inner volume of 5 liters substituted with nitrogen, there were charged 2,500 g of cyclohexane as a solvent, 50 g of tetrahydrofuran as a vinyl group content adjusting agent (randomizer) and 125 g of styrene and 365 g of 1,3-butadiene as monomers. After the temperature of the contents in the reaction vessel was adjusted to 10° C., 5.20 mmol of n-butyllithium as a polymerization initiator was added to initiate polymerization. The polymerization was performed under adiabatic conditions, and the maximum temperature reached 85° C.

At 25 minutes after the initiation of polymerization, it was confirmed that the polymerization conversion ratio reached 99%, and 10 g of 1,3-butadiene was added over 1 minute. Thereafter, 1.65 mmol of 2,2-dimethoxy-1-(3-trimethoxysilylpropyl)-1-aza-2-silacyclopentane as a modifier was added, and reacted for 15 minutes.

To the obtained polymer solution containing the modified conjugated diene-based copolymer, 4.40 g of 2,6-di-tert-butyl-p-cresol was added. After that, 1.88 mmol of silicon tetrachloride was further added thereto. Next, desolvation by steam stripping was performed, and drying by a roll warmed to 110° C. was performed to obtain a modified conjugated diene-based copolymer (B).

The polymerization formula and physical properties of the obtained modified conjugated diene-based copolymer (B) are shown in Table 1 and Table 2, respectively.

Production Example 3: Production Example of Modified Conjugated Diene-Based Polymer for Comparison A modified conjugated diene-based copolymer for comparison (hereinafter, also referred to as a "modified conjugated diene-based copolymer (C)") was obtained in the same method as that in Production Example 1 of the conjugated diene-based copolymer, except that in Production Example 1, 4.94 mmol of dimethyldiethoxysilane was used instead of 1.65 mmol of 2,2-dimethoxy-1-(3-trimethoxysilylpropyl)-1-aza-2-silacyclopentane.

The polymerization formula and physical properties of the obtained modified conjugated diene-based copolymer (C) are shown in Table 1 and Table 2, respectively.

TABLE 1

| Polymerization formula | | | Production Example 1 | Production Example 2 | Production Example 3 |
|---|---|---|---|---|---|
| Type of modified conjugated diene-based copolymer | | | A | B | C |
| Solvent | Cyclohexane | (g) | 2500 | 2500 | 2500 |
| Vinyl group-containing adjusting agent | Tetrahydrofuran | (g) | 50 | 50 | 50 |
| Monomer | Styrene | (g) | 125 | 125 | 125 |
| | 1,3-Butadiene | (g) | 365 | 365 | 365 |
| | Additional butadiene | (g) | 10 | 10 | 10 |
| Polymerization initiator | n-Butyllithium | (mmol) | 5.20 | 5.20 | 5.20 |
| Modifier | 2,2-Dimethoxy-1-(3-trimethoxysilylpropyl)-1-aza-2-cyclopentane | (mmol) | 1.65 | 1.65 | — |
| | Dimethyldiethoxysilane | (mmol) | — | — | 4.94 |
| Metal halide | Silicon tetrachloride | (mmol) | — | 1.88 | — |

TABLE 2

| | Production Example 1 | Production Example 2 | Production Example 3 |
|---|---|---|---|
| Type of modified conjugated diene-based copolymer | A | B | C |
| Bound styrene content (%) | 25 | 25 | 25 |
| Vinyl group content (%) | 58 | 57 | 58 |
| Weight-average molecular weight before modification (10,000) | 21 | 20 | 20 |
| Mooney viscosity ($ML_{1+4}$, 100° C.) | 50 | 85 | 10 |

Example 1, Example 2, Examples 4 to 6, Examples 8 to 10, Example 12 and Comparative Examples 1 to 7

Firstly, respective components were compounded according to the formula indicated in Table 3 below, and kneaded to produce a rubber composition. The kneading was performed by the following process.

As the first step (first-stage kneading), respective components compounded according to Table 3, that is, all components to be subjected to the first step, were concurrently kneaded using a plastomill (content volume: 250 ml)

equipped with a temperature controller, under the conditions of a rotational speed of 60 rpm and a kneading time of 4 minutes.

Next, as the second step (second-stage kneading), the kneaded product obtained in the above-described first step was cooled to room temperature, and thereafter respective components according to Table 3 were added and compounded in a plastomill (content volume: 250 ml) equipped with a temperature controller and kneaded under the conditions of a rotational speed of 60 rpm and a kneading time of 1.5 minutes to obtain a rubber composition (hereinafter, a "rubber composition (1)," a "rubber composition (2)," a "rubber composition (4)" to a "rubber composition (6)," a "rubber composition (8)" to a "rubber composition (10)," a "rubber composition (12)," and a "rubber composition (1) for comparison" to a "rubber composition (7) for comparison."

Next, each of the obtained rubber compositions (the rubber composition (1) to the rubber composition (7) for comparison) was molded, and subjected to vulcanization molding by a vulcanization press at 160° C. for a prescribed period of time to obtain a rubber elastic body having a prescribed shape according to evaluation tests described below.

Example 3, Example 7, Example 11 and Example 13

Firstly, respective components were compounded according to the formula indicated in Table 3 below, and kneaded to produce a rubber composition. The kneading was performed by the following process.

As the first step (first-stage kneading), respective components compounded according to Table 3, other than the silane coupling agent, were kneaded using a plastomill (content volume: 250 ml) equipped with a temperature controller under the conditions of a rotational speed of 60 rpm and a kneading time of 2 minutes, and thereafter the silane coupling agent was added and further kneaded under the conditions of a rotational speed of 60 rpm and a kneading time of 2 minutes. The temperature of the kneaded product obtained in the first step, specifically the temperature during discharging of the kneaded product discharged from the plastomill, was 150° C.

Next, as the second step (second-stage kneading), the kneaded product obtained in the above-described first step was cooled to room temperature, and thereafter respective components according to Table 3 were added and compounded in a plastomill (content volume: 250 ml) equipped with a temperature controller and kneaded under the conditions of a rotational speed of 60 rpm and a kneading time of 1.5 minutes to obtain a rubber composition (hereinafter, a "rubber composition (3)," a "rubber composition (7)," a "rubber composition (11) and a "rubber composition (13)"). The temperatures of the obtained rubber composition (3), rubber composition (7), rubber composition (11) and rubber composition (13), specifically the temperatures during discharging of the kneaded products discharged from the plastomill, were all 100° C.

Next, each of the obtained rubber compositions was molded, and subjected to vulcanization molding by a vulcanization press at 160° C. for a prescribed period of time to obtain a rubber elastic body having a prescribed shape according to evaluation tests described below.

Comparative Example 8

Firstly, respective components are compounded according to the formula indicated in Table 3 below, and kneaded to produce a rubber composition. The kneading was performed by the following process.

As the first step (first-stage kneading), respective components compounded according to Table 3, other than the basic compound A, were kneaded using a plastomill (content volume: 250 ml) equipped with a temperature controller under the conditions of a rotational speed of 60 rpm and a kneading time of 2 minutes, and thereafter the basic compound A was added and further kneaded under the conditions of a rotational speed of 60 rpm and a kneading time of 2 minutes. The temperature of the kneaded product obtained in this first step, specifically the temperature during discharging of the kneaded product discharged from the plastomill, was 150° C.

Next, as the second step (second-stage kneading), the kneaded product obtained in the above-described first step was cooled to room temperature, and thereafter respective components according to Table 3 were added and compounded in a plastomill (content volume: 250 ml) equipped with a temperature controller and kneaded under the conditions of a rotational speed of 60 rpm and a kneading time of 1.5 minutes to obtain a rubber composition (hereinafter, a "rubber composition (8) for comparison"). The temperature of the obtained rubber composition (8) for comparison, specifically the temperature during discharging of the kneaded product discharged from the plastomill, was 150° C.

Next, the obtained rubber composition (8) for comparison was molded, and subjected to vulcanization molding by a vulcanization press at 160° C. for a prescribed period of time to obtain a rubber elastic body having a prescribed shape according to evaluation tests described below.

Evaluation of Rubber Composition:

The obtained rubber compositions and rubber elastic bodies were subjected to evaluation tests as below. The results are illustrated in Table 4.

Evaluation Test of Processability:

The obtained rubber compositions (unvulcanized rubber compositions) and the kneaded products obtained in the first step (first-stage kneading) as measurement samples were each measured for Mooney viscosity ($ML_{1+4}$, 100° C.). In Table 4, the measured values of Mooney viscosity ($ML_{1+4}$, 100° C.) are indicated as an index based on the assumption that the measured value according to Comparative Example 1 (specifically, the measured value of the rubber composition (rubber composition (1) for comparison) or the measured value of the kneaded product obtained in the first step) is 100.

A larger value of Mooney viscosity ($ML_{1+4}$, 100° C.) indicates better processability.

Evaluation Test of Low Hysteresis Loss Property:

The obtained rubber elastic bodies (cross-linked rubber elastic bodies) as measurement samples were measured for 50° C. tan δ using an ARES viscoelasticity testing apparatus (manufactured by TA Instruments, Inc.), under the conditions of a dynamic shear strain of 3.0%, an angular velocity of 100 radians per second, and 50° C. In Table 4, the measured values of 50° C. tan δ are indicated as an index based on the assumption that the measured value according to Comparative Example 1 (specifically, the measured value of the rubber elastic body formed from the rubber composition (1) for comparison) is 100.

A larger value of 50° C. tan δ indicates a smaller low hysteresis loss property which is favorable.

Dispersibility of Filler:

The obtained rubber elastic bodies (cross-linked rubber elastic bodies) as measurement samples were measured for an elastic modulus difference ΔG' between an elastic modulus at a dynamic shear strain of 0.1% and an elastic modulus at a dynamic shear strain of 10.0%, using an ARES viscoelasticity testing apparatus (manufactured by TA Instruments, Inc.), under the conditions of an angular velocity of 100 radians per second and 50° C. In Table 4, the measured values of an elastic modulus difference ΔG' are indicated as an index based on the assumption that the measured value according to Comparative Example 1 (specifically, the measured value of the rubber elastic body formed from the rubber composition (1) for comparison) is 100.

A larger value of an elastic modulus difference ΔG' indicates better dispersibility of a filler.

TABLE 3

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| First step | Modified conjugated diene-based copolymer | Type | A | A | A | B | B | B | B | B | B |
|  |  | Use ratio (parts by mass) | 70 | 70 | 70 | 70 | 70 | 70 | 70 | 70 | 70 |
|  | Polybutadiene rubber (parts by mass) *1 |  | 30 | 30 | 30 | 30 | 30 | 30 | 30 | 30 | 30 |
|  | Extender oil (parts by mass) *2 |  | 30 | 30 | 30 | 30 | 30 | 30 | 30 | 30 | 30 |
|  | Silica (parts by mass) *3 |  | 70 | 70 | 70 | 70 | 70 | 70 | 70 | 70 | 70 |
|  | Silane coupling agent (parts by mass) *4 |  | 5.6 | 5.6 | 5.6 | 5.6 | 5.6 | 5.6 | 5.6 | 5.6 | 5.6 |
|  | Stearic acid (parts by mass) |  | 2 | — | — | 2 | 2 | — | — | 2 | 2 |
|  | Anti-aging agent (parts by mass) *5 |  | 1 | 1 | 1 | 1 | 1 | 1 | 1 | 1 | 1 |
|  | Basic compound A (pKa = 11.2) (parts by mass) *6 |  | 1.5 | 1.5 | 1.5 | 1.5 | — | 1.5 | 1.5 | — | 1.5 |
|  | Basic compound B (pKa = 8.4) (parts by mass) *7 |  | — | — | — | — | 1.5 | — | — | — | — |
|  | Basic compound C (pKa = 4.6) (parts by mass) *8 |  | — | — | — | — | — | — | — | — | — |
|  | Basic compound D (pKa = 10.6) (parts by mass) *9 |  | — | — | — | — | — | — | — | 1.5 | 1.5 |
|  | Compound A for generation *10 |  | — | — | — | — | — | — | — | — | — |
|  | Compound B for generation *11 |  | — | — | — | — | — | — | — | — | — |
|  | Time (seconds) until addition of silane coupling agent after addition of silica and basic compound and/or compounds for generation |  | — | — | 120 | — | — | — | 120 | — | — |
| Second step | Stearic acid |  | — | 2 | 2 | — | — | 2 | 2 | — | — |
|  | Zinc oxide |  | 3 | 3 | 3 | 3 | 3 | 3 | 3 | 3 | 3 |
|  | Vulcanization promoter D *12 |  | — | — | — | — | — | — | — | — | — |
|  | Vulcanization promoter CZ (= compound A for generation) *10 |  | 1.8 | 1.8 | 1.8 | 1.8 | 1.8 | 1.8 | 1.8 | 1.8 | 1.8 |
|  | Vulcanization promoter MBT (= compound B for generation) *11 |  | — | — | — | — | — | — | — | — | — |
|  | Sulfur |  | 1.5 | 1.5 | 1.5 | 1.5 | 1.5 | 1.5 | 1.5 | 1.5 | 1.5 |

|  |  |  | Example 10 | Example 11 | Example 12 | Example 13 | Comparative Example 1 | Comparative Example 2 | Comparative Example 3 |
|---|---|---|---|---|---|---|---|---|---|
| First step | Modified conjugated diene-based copolymer | Type | B | B | B | B | A | B | C |
|  |  | Use ratio (parts by mass) | 70 | 70 | 70 | 70 | 70 | 70 | 70 |
|  | Polybutadiene rubber (parts by mass) *1 |  | 30 | 30 | 30 | 30 | 30 | 30 | 30 |
|  | Extender oil (parts by mass) *2 |  | 30 | 30 | 30 | 30 | 30 | 30 | 30 |
|  | Silica (parts by mass) *3 |  | 70 | 70 | 70 | 70 | 70 | 70 | 70 |

TABLE 3-continued

|  |  |  |  |  |  |  |  |  |
|---|---|---|---|---|---|---|---|---|
|  | Silane coupling agent (parts by mass) *4 | 5.6 | 5.6 | 5.6 | 5.6 | 5.6 | 5.6 | 5.6 |
|  | Stearic acid (parts by mass) | — | — | — | — | 2 | 2 | 2 |
|  | Anti-aging agent (parts by mass) *5 | 1 | 1 | 1 | 1 | 1 | 1 | 1 |
|  | Basic compound A (pKa = 11.2) (parts by mass) *6 | 1.5 | 1.5 | 1.5 | 1.5 | — | — | — |
|  | Basic compound B (pKa = 8.4) (parts by mass) *7 | — | — | — | — | — | — | — |
|  | Basic compound C (pKa = 4.6) (parts by mass) *8 | — | — | — | — | — | — | — |
|  | Basic compound D (pKa = 10.6) (parts by mass) *9 | 1.5 | 1.5 | — | — | — | — | — |
|  | Compound A for generation *10 | — | — | 1.8 | 1.8 | — | — | — |
|  | Compound B for generation *11 | — | — | 1.2 | 1.2 | — | — | — |
|  | Time (seconds) until addition of silane coupling agent after addition of silica and basic compound and/or compounds for generation | — | 120 | — | 120 | — | — | — |
| Second step | Stearic acid | 2 | 2 | 2 | 2 | — | — | — |
|  | Zinc oxide | 3 | 3 | 3 | 3 | 3 | 3 | 3 |
|  | Vulcanization promoter D *12 | — | — | — | — | 1.5 | 1.5 | 1.5 |
|  | Vulcanization promoter CZ (= compound A for generation) *10 | 1.8 | 1.8 | — | — | 1.8 | 1.8 | 1.8 |
|  | Vulcanization promoter MBT (= compound B for generation) *11 | — | — | — | — | — | — | — |
|  | Sulfur | 1.5 | 1.5 | 1.5 | 1.5 | 1.5 | 1.5 | 1.5 |

|  |  |  | Comparative Example 4 | Comparative Example 5 | Comparative Example 6 | Comparative Example 7 | Comparative Example 8 |
|---|---|---|---|---|---|---|---|
| First step | Modified conjugated diene-based copolymer | Type | C | B | B | B | A |
|  |  | Use ratio (parts by mass) | 70 | 70 | 70 | 70 | 70 |
|  | Polybutadiene rubber (parts by mass) *1 |  | 30 | 30 | 30 | 30 | 30 |
|  | Extender oil (parts by mass) *2 |  | 30 | 30 | 30 | 30 | 30 |
|  | Silica (parts by mass) *3 |  | 70 | 70 | 70 | 70 | 70 |
|  | Silane coupling agent (parts by mass) *4 |  | 5.6 | 5.6 | 5.6 | 5.6 | 5.6 |
|  | Stearic acid (parts by mass) |  | 2 | 2 | 2 | 2 | 2 |
|  | Anti-aging agent (parts by mass) *5 |  | 1 | 1 | 1 | 1 | 1 |
|  | Basic compound A (pKa = 11.2) (parts by mass) *6 |  | 1.5 | — | — | — | 1.5 |
|  | Basic compound B (pKa = 8.4) (parts by mass) *7 |  | — | — | — | — | — |
|  | Basic compound C (pKa = 4.6) (parts by mass) *8 |  | — | 1.5 | — | — | — |
|  | Basic compound D (pKa = 10.6) (parts by mass) *9 |  | — | — | — | — | — |
|  | Compound A for generation *10 |  | — | — | — | — | — |

TABLE 3-continued

|  |  |  | | | | | |
|---|---|---|---|---|---|---|---|
| | | Compound B for generation *11 | — | — | — | 1.2 | — |
| | | Time (seconds) until addition of silane coupling agent after addition of silica and basic compound and/or compounds for generation | — | — | — | — | *13 |
| | Second step | Stearic acid | — | — | — | — | — |
| | | Zinc oxide | — | 3 | 3 | 3 | 3 |
| | | Vulcanization promoter D *12 | — | — | — | — | 1.5 |
| | | Vulcanization promoter CZ (= compound A for generation) *10 | 1.8 | 1.8 | 1.8 | 1.8 | 1.8 |
| | | Vulcanization promoter MBT (= compound B for generation) *11 | — | — | 1.2 | — | — |
| | | Sulfur | 1.5 | 1.5 | 1.5 | 1.5 | 1.5 |

*1 BR01 manufactured by JSR Corporation
*2 JOMO Process NC-140 manufactured by Japan Energy Corporation
*3 ZEOSIL 1165MP manufactured by Rhodia
*4 Si75 manufactured by Evonik
*5 Ozonone 6C: N-(1,3-dimethylbutyl)-N'-phenyl-p-phenylenediamine, manufactured by Seiko Chemical Co., Ltd.
*6 Piperidine manufactured by Koei Chemical Company, Limited
*7 Tetrahydro-1,4-oxazine (morpholine) manufactured by Tokyo Chemical Industry Co., Ltd.
*8 Aniline manufactured by Tokyo Chemical Industry Co., Ltd.
*9 Farmin 80S: stearyl amine, manufactured by Kao Corporation
*10 Nocceler CZ: N-cyclohexyl-2-benzothiazorylsulfenamide. manufactured by Ouchi Shinko Chemical Industrial Co., Ltd
*11 Nocceler M-P: 2-mercaptobenzothiazol, manufactured by Ouchi Shinko Chemical Industrial Co., Ltd.
*12 Nocceler D: 1,3-diphenylguanidine, manufactured by Ouchi Shinko Chemical Industrial Co., Ltd.
*13 Time until addition of basic compound after addition of silica is 120 seconds.

TABLE 4

| Properties of rubber composition | Example 1 | Example 2 | Example 3 | Example 4 | Example 5 | Example 6 | Example 7 | Example 8 |
|---|---|---|---|---|---|---|---|---|
| Mooney viscosity in first step ($ML_{1+4}$, 100° C.) (index) | 110 | 120 | 127 | 115 | 108 | 128 | 135 | 140 |
| Mooney viscosity in second step ($ML_{1+4}$, 100° C.) (index) | 102 | 107 | 115 | 105 | 102 | 116 | 124 | 125 |
| 50° C. tanδ(index) | 105 | 109 | 112 | 107 | 103 | 112 | 119 | 110 |
| ΔG' (index) | 110 | 116 | 130 | 115 | 107 | 137 | 142 | 120 |

| Properties of rubber composition | Example 9 | Example 10 | Example 11 | Example 12 | Example 13 | Comparative Example 1 | Comparative Example 2 |
|---|---|---|---|---|---|---|---|
| Mooney viscosity in first step ($ML_{1+4}$, 100° C.) (index) | 150 | 155 | 170 | 110 | 115 | 100 | 80 |
| Mooney viscosity in second step ($ML_{1+4}$, 100° C.) (index) | 130 | 135 | 145 | 102 | 110 | 100 | 98 |
| 50° C. tanδ(index) | 115 | 120 | 125 | 120 | 130 | 100 | 97 |
| ΔG' (index) | 130 | 140 | 145 | 135 | 140 | 100 | 98 |

| Properties of rubber composition | Comparative Example 3 | Comparative Example 4 | Comparative Example 5 | Comparative Example 6 | Comparative Example 7 | Comparative Example 8 |
|---|---|---|---|---|---|---|
| Mooney viscosity in first step ($ML_{1+4}$, 100° C.) (index) | 130 | 127 | 84 | 72 | 65 | 105 |
| Mooney viscosity in second step ($ML_{1+4}$, 100° C.) (index) | 125 | 127 | 100 | 85 | 75 | 95 |
| 50° C. tanδ(index) | 80 | 83 | 99 | 104 | 105 | 100 |
| ΔG' (index) | 80 | 85 | 101 | 121 | 120 | 105 |

As confirmed from the results in Table 4, the production processes of a rubber composition according to Example 1 to Example 13 can provide rubber compositions in which processability is excellent, and a filling agent has favorable dispersibility. Furthermore, it was confirmed that a rubber elastic body formed from the rubber composition has an excellent low hysteresis loss property.

It was also confirmed that in particular, subjecting the acidic compound to the second step and post-adding the silane coupling agent enhance processability, dispersibility of a filling agent, and a low hysteresis loss property more.

It was confirmed that the same effects can also be obtained in the modified conjugated diene-based copolymer obtained by the same method as that in Production Example 1 of the conjugated diene-based copolymer, except that in Production Example 1, 4.16 mmol of N,N-bis(trimethylsilyl)aminopropylmethyldiethoxysilane was used instead of 1.65 mmol of 2,2-dimethoxy-1-(3-trimethoxysilylpropyl)-1-aza-2-silacyclopentane.

It was confirmed that the same effects can also be obtained in the modified conjugated diene-based copolymer obtained by the same method as that in Production Example 1 of the conjugated diene-based copolymer, except that in Production Example 1, 4.94 mmol of piperidine was added simultaneously with 5.20 mmol of n-butyllithium.

The invention claimed is:

1. A production process of a rubber composition comprising:
    a first step of kneading a modified conjugated diene-based polymer that is obtained by polymerizing a monomer containing a conjugated diene compound and has at least one nitrogen-containing functional group selected from the group consisting of a primary amino group, a secondary amino group, a tertiary amino group, a primary amino group having been converted into an onium group, a secondary amino group having been converted into an onium group and a tertiary amino group having been converted into an onium group, and a basic compound having an acid dissociation constant of not lower than 8.0; and
    a second step of kneading the kneaded product obtained in the first step and a cross-linking agent,
    wherein in the first step, silica is kneaded together with the modified conjugated diene copolymer and the basic compound having an acid dissociation constant of not lower than 8,
    and then a silane coupling agent is added thereto and further kneaded.

2. The production process of a rubber composition according to claim 1, wherein the basic compound having an acid dissociation constant of not lower than 8.0 is an amine compound.

3. The production process of a rubber composition according to claim 1, wherein in the second step, an acidic compound is kneaded together with the kneaded product and the cross-linking agent.

4. The production process of a rubber composition according to claim 3, wherein the acidic compound is a saturated fatty acid having 12 to 24 carbon atoms.

5. The production process of a rubber composition according to claim 1, wherein the basic compound having an acid dissociation constant of not lower than 8.0 is generated by kneading a plurality of compounds together with the modified conjugated diene-based polymer in the first step.

6. The production process of a rubber composition according to claim 5, wherein the plurality of compounds includes a sulfenamide-based compound and a thiazole-based compound.

7. The production process of a rubber composition according to claim 1, wherein the cross-linking agent is sulfur.

8. A production process of a rubber composition comprising:
    a first step of kneading a modified conjugated diene-based polymer that is obtained by polymerizing a monomer containing a conjugated diene compound and has at least one nitrogen-containing functional group selected from the group consisting of a primary amino group, a secondary amino group, a tertiary amino group, a primary amino group having been converted into an onium group, a secondary amino group having been converted into an onium group and a tertiary amino group having been converted into an onium group, and a basic compound having an acid dissociation constant of not lower than 8.0; and
    a second step of kneading the kneaded product obtained in the first step and a cross-linking agent,
    wherein the basic compound having an acid dissociation constant of not lower than 8.0 is generated by kneading a plurality of compounds together with the modified conjugated diene-based polymer in the first step.

9. The production process of a rubber composition according to claim 8, wherein the plurality of compounds includes a sulfenamide-based compound and a thiazole-based compound.

* * * * *